US005316198A

United States Patent [19]

Fuchs et al.

[11] Patent Number: 5,316,198

[45] Date of Patent: May 31, 1994

[54] MEDIA DISPENSER WITH ELASTICALLY DEFORMABLE PLUNGER

[75] Inventors: Karl-Heinz Fuchs, Radolfzell; Lothar Graf, Rielasingen-Worblingen, both of Fed. Rep. of Germany

[73] Assignee: Ing. Erich Pfeiffer GmbH & Co. KG, Radolfzell, Fed. Rep. of Germany

[21] Appl. No.: 858,815

[22] Filed: Mar. 27, 1992

[30] Foreign Application Priority Data

Mar. 28, 1991 [DE] Fed. Rep. of Germany ....... 4110303

[51] Int. Cl.$^5$ .......... G01F 11/00

[52] U.S. Cl. .......... 222/321; 222/341

[58] Field of Search .......... 222/321, 336, 339, 340, 222/341, 378, 379, 380, 381, 385, 383; 239/333

[56] References Cited

U.S. PATENT DOCUMENTS

| | | | |
|---|---|---|---|
| 3,774,849 | 11/1973 | Boris | 222/321 |
| 4,017,031 | 4/1977 | Kishi et al. | 222/321 |
| 4,144,987 | 3/1979 | Kishi | 222/321 |
| 4,179,049 | 12/1979 | Umstead | 222/321 |
| 4,225,061 | 9/1980 | Blake et al. | 222/383 |
| 4,305,530 | 12/1981 | Nozawa | 222/321 |
| 4,415,121 | 11/1983 | Berger et al. | 239/229 |
| 4,694,977 | 9/1987 | Graf et al. | 222/321 |
| 4,762,475 | 8/1988 | Fuchs | 222/383 |
| 4,830,284 | 5/1989 | Maerte | 222/321 |
| 4,934,568 | 6/1990 | Fuchs | 222/321 |
| 5,203,840 | 4/1993 | Graf et al. | 222/321 |
| 5,228,586 | 7/1993 | Fuchs | 222/321 |

FOREIGN PATENT DOCUMENTS

| | | | |
|---|---|---|---|
| 199143 | 10/1986 | European Pat. Off. | 222/321 |
| 289854 | 11/1988 | European Pat. Off. . | |
| 0369125 | 5/1990 | European Pat. Off. . | |
| 0394750 | 10/1990 | European Pat. Off. . | |
| 2825428 | 12/1979 | Fed. Rep. of Germany . | |
| 3248370 | 7/1984 | Fed. Rep. of Germany . | |
| 3715300 | 11/1988 | Fed. Rep. of Germany . | |
| 3834091 | 4/1990 | Fed. Rep. of Germany . | |
| 3836236 | 4/1990 | Fed. Rep. of Germany . | |
| 8628605 | 6/1990 | Fed. Rep. of Germany . | |
| 197810 | 9/1978 | France | 222/341 |

*Primary Examiner*—Andres Kashnikow
*Assistant Examiner*—Philippe Derakshani
*Attorney, Agent, or Firm*—Quarles & Brady

[57] ABSTRACT

For restoring purposes, a discharge apparatus (1) has a gas spring (53) and for the displacement of dead volumes a filling body (70) which, like two valve bodies (23, 54) movable against one another of two valves (21, 55) with different functions, can be formed by a single component. An exposed operating ram or plunger (20), which surrounds an outlet channel (19) and is contact-free over most of its length, is constructed in one piece with a pump piston (17) and a nozzle core (48) of an outlet opening (8), while being directly connected to the spring (53). This gives high operational reliability of the discharge apparatus (1) with a simple construction.

25 Claims, 3 Drawing Sheets

MEDIA DISPENSER WITH ELASTICALLY DEFORMABLE PLUNGER

BACKGROUND OF THE INVENTION

The invention relates to a dispenser, with which one or more media can be discharged singly or in mixed form by manual force or by pressure. The medium can have a random aggregate state or random consistency and can be liquid, gaseous, pulverulent, pasty, etc.

Appropriately, said discharge apparatus has a size so that it can be carried in one hand or is suitable for one-handed operation. It can at least partly be made from a plastically shaped material, which instead of being metallic, is preferably nonmetallic, such as an injection molding plastic. It is advantageous with such discharge apparatuses to provide at least one ram to be moved manually or either in pressure-dependent or path-dependent manner, or both, for the discharge operation because it is then possible to bring about a reliable mounting of all the associated functional parts and a force transfer between remote positions. Fitting is made easier; medium guidance is improved; and functional controls can be obtained during the discharge operation. If the ram has an elastically deformable shaft portion, the ram can be guided on the associated dispenser body by at least one dimensionally more stable shaft portion axially adjacent thereto. However, this construction leads to larger dimensions, and also, the stronger shaft portion must be so strongly dimensioned over a significant length that under the conventionally occurring operating loads it does not elastically deform.

OBJECTS OF THE INVENTION

An object of the invention is to provide a discharge apparatus of the aforementioned type, in which disadvantages of known constructions are avoided. Optionally, in the case of a compact construction, it is particularly necessary to ensure a reliable guidance of at least one ram.

SUMMARY OF THE INVENTION

According to the invention, the dispenser ram is directly slidingly supported by a shaft portion on a dispenser body. The shaft portion appropriately deforms to a different shape in at least two different operating states of the discharge apparatus. Thus, control movements can at least be derived from such a shape change, or such movements can at least be influenced. Unlike a sealing piston, such as a pump piston slightly radially deformable in the vicinity of its outer or inner circumference, it is here an elongated ram or shaft portion, whose deformation can take place in a random direction. However, the deformation is preferably axially or radially directed or both and is given by bending, expansion and compression of the associated material cross-section.

It is particularly appropriate if the deforming ram is a shaft portion that is defined by two remote ends positionally variable relative to one another by deformation. The ends are appropriately both guided in the described manner in at least one operating state. The shaft portion and its ends are preferably constructed in one piece with one another. The ends are appropriately variable in their reciprocal spacing by compression of the shaft portion. A restoring of this spacing to an initial state is appropriately brought about by a spring, which can be formed in one piece by inherent resiliency of the shaft portion located between the ends. If the compression of the shaft portion can lead to a radially outwardly directed bulge, the guide can consequently ensure a reliable, clearance-free support against such a radial deformation in at least one operating position. The guide can allow the deformation another operating position.

To obtain a particularly simple construction, the guided shaft portion can be constructed in one piece with numerous functional parts. These parts are appropriate for further functions of the discharge apparatus, and in particular, for influencing the medium guide. They can be valve controls, ducts, nozzle bodies, plug connections or junctions, pump chamber boundaries or components thereof. If on one end of the ram, or directly axially adjacent the shaft portion, there is a piston guided on a cylinder path, then, when the associated end of the shaft portion passes out of its guide, it can assume the guidance thereof. The length of the sliding guide further ram is appropriately sufficient to ensure that, at the end of the ram travel, the other end of the shaft portion has not completely left the guide, but still remains guided and supported. By displacing the associated end of the guide, it is thereby possible to adjust the shaft portion length which is available in maximum manner for deformation purposes. This length is shorter than the total length of the total deformable shaft portion available if released from the sliding guide.

The additional shaft portion guide formed by piston lips can in the longitudinal direction thereof be approximately directly connected to the associated shaft portion end, independently of whether it is guided on a larger or shorter width than the shaft portion. Thus, said end is secured in well centered manner in all operating states.

Independently of the described construction, at least one valve of the dispenser can be constructed in such a way that both the valve faces to be moved against one another for narrowing and widening the valve passage can be made from one elastic material. The latter is elastically resilient over a controlled path with respect to bending, stretching and compression of the associated material cross-section. This brings about a particularly good seal of the valve in a closed position. In addition, the valve faces are not very prone to damage or wear.

The spring formed by the shaft portion, or some other functional spring of the discharge apparatus, is substantially free from an engagement on a support in each operating position on that side from which it moves away during its spring deflection. In one operating position, the spring appropriately faces in spaced manner a support, which prevents a greater spring deflection to this side. However, it also makes it possible to temporarily support the spring, e.g. under a compressive load, on said side until it has been freed over an adequately large length with respect to the sliding guide. Thus, the support is substantially fixed or constant relative to the shaft portion.

For connecting the ram or the shaft portion to a connecting functional part, there is appropriately an elastic connecting member, which can be an insertion member or the like or, advantageously, an elastic pin located in the shaft portion. This pin can form the support for the back of the spring. The pin also ensures a reliable connection when there is a limited length of the firmly interengaging faces.

The inventive discharge apparatus can comprise very few components, e.g. only five components, or, including a cap for the discharge opening, six components made from plastic. Two to all the components are appropriately made from the same material, which can be reprocessed together or as a mixture for the production of other products.

BRIEF FIGURE DESCRIPTION

These and further features can be gathered from the claims, description and drawings and the individual features, either singly or in the form of sub-combinations, can be realized in an embodiment of the invention and in other fields and can represent advantageous, independently protectable constructions for which protection is hereby claimed. An embodiment of the invention is described in greater detail hereinafter relative to the drawings, wherein show:

FIG. 1 An inventive discharge apparatus, partly in axial section.

FIG. 2 A functional subassembly of the discharge apparatus according to FIG. 1 on a larger scale.

FIG. 3 A detail of FIG. 1 on a much larger scale.

DETAILED DESCRIPTION OF A PREFERRED EXAMPLE EMBODIMENT

Figure 1:
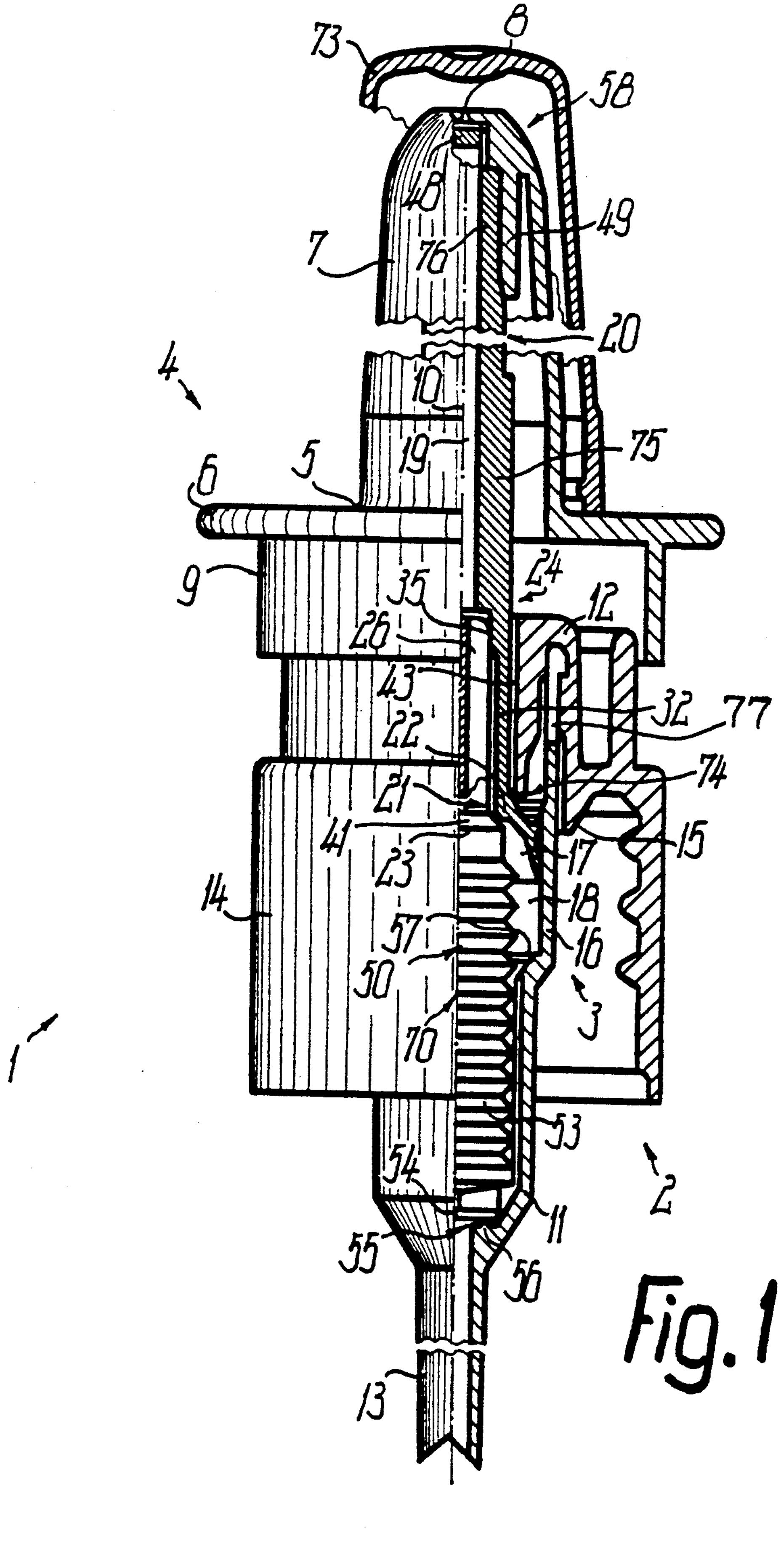

The discharge apparatus 1 has a body 2 to be secured by fixing on a medium reservoir, such as a bottle, an aerosol can, etc. The body 2 is provided with a pump 3 projecting through the container neck into the medium reservoir and a freely outwardly projecting operating or actuating unit 4. The latter unit 4 manually performs the pumping movement in the case of a pump and the opening movement of a discharge valve only in the case of a pressure reservoir. The unit projecting into the container neck has an exposed, accessible head, which can be constructed with a dispenser portion, such as a discharge and operating head 5. For this purpose, it has a medium outlet, such as a discharge opening 8, for the medium and a handle 6. A connecting piece or support 7 projects upwardly from the plate-like handle 6, which is located at right angles to the operating direction. The support 7 is traversed at its end region by the discharge opening 8. A cap 9 engaging partly over the body 2 projects over the top end and the end wall for said cap is formed by the handle 6.

Substantially all the aforementioned components are located approximately in a common plane 10, the actuating or operating direction being roughly parallel thereto. The body 2 has a multiply stepped tubular casing 11 and a cover 12 on its top end. The cover 12 engages the inner circumference of the casing 11 as a hollow sheet. The cover 12 engages as an outer jacket over the outside of the casing 11 in such a way that a positionally rigid connection is obtained. On the narrower lower end, further removed from the operating head 5, the one-piece casing 11 has a riser 13 optionally constructed in one piece therewith. By means of the riser 13, the pump 3 and the discharge opening 8 is supplied with medium from the bottom area of the medium reservoir not shown.

The body 2 can be fixed to the medium reservoir by a crimp ring, a plug connection, a screw connection or the like. It has a fastening cap 14 for engaging over the container neck. The cap 14 is constructed in one piece with the cover 12 and a sealing flange 15 for the outward sealing of the reservoir, which can project in annular manner over the inside of its cap end wall.

With a longitudinal portion connected to the cover 12, the casing 11 forms a pump cylinder 16. In the cylinder 16, a further dispenser portion, such as an annular pump piston 17, is displaceable by the handle 6 in such a way that a pump chamber 18 defined by these components is constricted for medium discharge and enlarged for suction from the reservoir. The discharge from the pump chamber 18 takes place through an outlet channel 19 having medium guide faces and defining medium spaces leading to the discharge opening 8 and which is substantially located along the axis 10 in an operating plunger or ram 20. The discharge is controlled by means of a delivery valve 21 located within either the casing 11 or the cover 12. The operating ram 20 connects the operating head 5 to the pump piston 17 and traverses the central opening of the cover 12. The operating rod 20 is fixed in substantially positionally rigid manner to the operating head 5.

The valve 21 has two cross-sectionally, substantially annular, telescoped valve bodies 22, 23, which are displaceable relative to one another in approximately radial clearance-free manner and which together form a component of the operating rod 20 and can be displaceable with the latter. The inner valve body 23 is operationally connected as a result of this relationship with valve body 22 in positionally rigid manner to the operating head 5, so that it is formed by a component or a member 26 of a support component 24. Its other member 26 is fixed to the connecting piece 7 in the vicinity of the free end. The outer valve body 22 is movably mounted roughly parallel to the axis 10 and the operating direction on said support component 24. It is formed by a valve component 27 made from a material which is bending, expansion and compression-elastic with respect to its functional movement.

Figure 2:
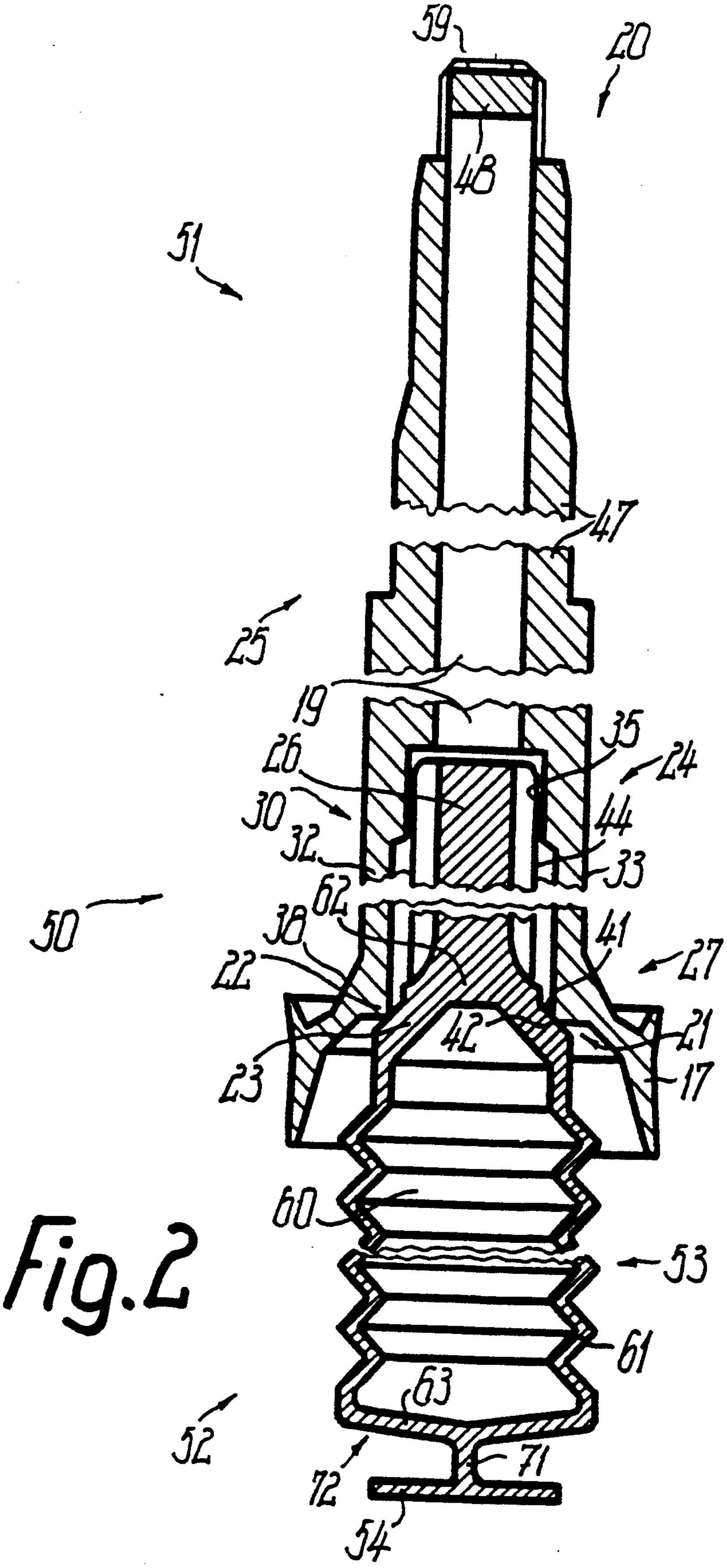

According to FIGS. 1 and 2, the components or portions 25, 26 are combined in one piece with the support component 24 and between them there is a through, one-piece connection 20. The outer valve body 22 constructed in one piece with said components is formed by a roughly identically long ring region compared with its wall thickness and which is appropriately located within the outer jacket of the pump piston 17, between its two circumferential sealing lips pointing away from one another or roughly in the plane of the end face of the circumferential sealing lip pointing away from the medium inlet. The cross-sectionally approximately rectangular and equilaterally triangular valve body 22 is directed in one piece to a valve spring 32 in the vicinity of an imaginary profile corner zone. The valve spring is cross-sectionally at least partly annular. It appropriately has at least in the connection area, and perhaps approximately over its entire length, an identical inside width to the valve body 22, which gives a through constant, step-free inner circumference. The constant outer circumference 33 of the valve spring 32 over its entire length is connected to the base edge of the outer profile of the valve body 22. The edge passes continuously beyond the triangular profile and roughly linearly up to the inner circumference of the piston jacket.

On the leading end of the valve spring 32 remote from the valve body 22, the inner circumference of the portion 24 or 25 forms a hollow section, such as an insertion receptacle 35, for the member 26 which, as an insertion pin, also extends over the length of the valve spring 32 and approximately the length of the valve body 22. The insertion pin 26 is provided with longitudinal grooves on its outer circumference and is externally covered by the valve body 22 and the valve spring 32. The grooves consequently form portions of the outlet channel 19, which is closed over the circumference and connected to the valve 21 or the pump chamber 18. At the most, the receptacle 35 is as long as or shorter than its width. The upper terminus of the receptacle approximately corresponds to the upper leading end of the valve spring 32. At its other, lower end, the insertion pin 26 is connected in one piece to the inner valve body 23, which is cross-sectionally cap-like or hollow. Its cap end wall is formed by the lower end of the insertion pin 26.

The outer circumference 38 of the valve body 22 is conically widened toward the medium intake. This conical portion forms a valve body of a vent valve for the storage container. The other valve body for the vent valve is formed by the inner end of the hollow sleeve of the cover 12. The vent valve opens in path-dependent manner with the start of the discharge operation. Thus, air from the storage container can pass through an opening 77 in the casing 11 and between the inner circumference of the cover 12 and the valve spring 32 outwards into the open. During the return stroke, the outer circumference 38 strikes against the inner edge of the cover 12. Thus, an axial stretching force and a radially inwardly directed force in the sense of a closing of the valve 21 act on the valve body 22 and the valve spring 32. The maximum travel of the operating rod 20 is smaller than the length of the valve spring 32, which engages, as an elastic shaft section or portion, in the starting position, completely within the cover 12. At the end of the travel, the spring 32 is still guided with a part of its length within the cover 12. Consequently, only a longitudinal portion of the constant tubular profile connected to the valve body 22 forms the part of the valve spring 32 elastically deformable by outward bulging. An axially adjacent portion still within the cover 12 can be deformed by a slight axial compression within the cover 12.

The valve body 23 forms, with its upper and lower frustum-shaped-bounded cap jacket with a roughly constant wall thickness on the outer circumference, a conical valve seat 41, which defines with the annular valve closing face 42 of the valve body 22, a completely closable, circular valve opening. The valve seat 41 also determines an axial stop position for the closed position of the valve 21. The closing face 42 is bounded by flanks of the triangular profile of the valve body 22, which are roughly at right angles to one another, and the face 42 is appropriately approximately sharp-edged. Its flank roughly at right angles to the axis 10 passes into the inner circumference of the conical portion. This portion directly connects the valve body 22 to the piston jacket and has the outer circumference 38. The narrower end of the valve seat 42 is directly connected to the identical and constantly wide outer circumference of the insertion pin 26.

A support guide 43 surrounds the valve spring 32 over its entire length in the starting position and roughly over half the length of the valve spring 32 in the pump stroke end position and can serve as means for guiding the shaft section 32 during deformations transverse to a face of the guide 43, namely, radially. The support 43 is formed in a through passage opening by the inner circumference of the cover 12, on which is slidably guided the operating rod 20. The cover 12 can be provided with longitudinal grooves for venting purposes. The associated outer circumference 33 of the valve spring 32 passes from extends beyond the valve body 22 with such a significant length and with a constant width that, also at the stroke end position, it is guided over the entire length of the support 43. This length extends from the lower end of the hollow sleeve to the upper face of the cover 12. A further support 44 faces, with a smaller gap than the material thickness of the valve spring 32, the first support guide 43. The support 44 is formed by the outer circumference of the portion of the insertion pin 26 connected to the receptacle 35. Substantially in all the operating states, said portion is contact-free with respect to the inner circumference of the valve spring 32 and/or the valve body 22.

The valve body 22 can only be axially raised from the valve seat 41 for valve opening purposes after a given displacement of the unit 4, namely, if the valve spring 32 has become free from the support 43 over a sufficiently great length. The adjustment is appropriately such that the opening takes place at or towards the end of the pump stroke. During this opening movement, the valve spring 32 can only give way in an outwardly radial direction due to the support 44 moving with it. Its jacket is elastically bulged until the pump stroke is ended by stop action.

The valve 21 is suitable both for a path-dependent and a pressure-dependent control. It can operate either as a slide valve or as a hose valve. In the case of path-dependent opening, the valve body 22 is appropriately displaced to a stop 57, against which the associated component strikes during the operating movement of the operating head 5. The stop 57 can be formed by an inner shoulder at the end of the cylinder 16, against which runs the pump piston 17. The valve spring 32 can be completely tension-free in the closed or starting position.

The portion 25 of the component 24 is constructed in one piece with a shaft portion 47 connected to the valve spring 32. Said portion 25 is located over most of its length in contact and deformation-free manner within an outer jacket of the connecting piece 7. It forms with its upper end, a nozzle core 48 or a whirling or twisting device at the inner end of the nozzle hole, which forms the discharge opening 8. This nozzle core 48 projects with a reduced width axially past an end portion of the shaft portion 25. The end portion is jammed tight in an insertion sleeve or socket 49 located within the outer jacket of the connecting piece 7 and which is firmly connected in one-piece with said connecting piece 7.

At its upper end or in the transition region to the outer jacket, the socket 49 forms a nozzle cap 58 constructed in one piece with the connecting piece wall traversed by the discharge opening 8. The nozzle core is appropriately provided on the associated end face with profilings 59 for producing a whirling action, so that the inside of the cap end wall can be planar and free from profilings or steps. The outlet channel 19 is only surrounded over its entire circumference between the insertion pin 26 and the nozzle core 48 by the portion 25. Adjacent the region of the nozzle core 48, the outlet channel 19 has a flat oval cross-section. In the vicinity of the back of the nozzle core 58, which is remote from the discharge opening 8, the channel 19 passes radially out of the shaft portion 47 against the inner circumference of the nozzle cap. The flow is axially deflected along the outsides of the nozzle core 48 and is then guided radially inwards again along the profilings 59 to the outlet opening 8. As a result of the described construction, the socket 49 can be very short. The shaft portion 47 can be positioned in contact-free manner approximately over its entire length or between the spaced, facing faces of the socket 49 and the cover 12 or the body 2 and the casing 11, namely within the connecting piece, the handle 6 and the cap 9. The end 76 of the operating rod 20 within the socket 49 is approximately reduced in outside width compared with the connecting or remaining longitudinal area of the shaft portion 47.

The operating rod 20, including the valve 21 and further components, can form a prefitted assembly 50, which is inserted from the inside into the cover 12 and is then connected to the operating head 5. This assembly contains or comprises two prefitted subassemblies 51, 52, one of which is in one piece. It contains the support portion 25 and the valve component 27. The other subassembly 52 can also be constructed continuously in one piece. Apart from the insertion pin 26 and the valve body 23, it also contains a restoring spring 53 for the unit 4 and/or a valve body 54 of an intake valve 55 of the medium intake. A valve seat 56 for the valve body 54 is formed by an inner ring shoulder of the casing 11. The restoring spring 53, which is appropriately constructed as a bellows and/or gas spring, is roughly located along the axis 10 within the casing 11. It thus engages in the hollow pump piston 17, the pump chamber 18 and a narrower casing portion extending from the cylinder 16. Its abutment with respect to the body 2 can be formed by the valve seat 56.

According to the invention, an elastically deformable shaft portion, here formed by the valve spring 22, is guided directly on the body 2, namely on the casing 11 or on the cover 12, namely by means of its outer circumference engaging the support guide 43. The end of this shaft portion 32 corresponding to the upper end of the support guide 43 is located in each operating position between the ends of the support guide 43. Its length is greater, particularly roughly twice as large as the outside width of the shaft portion 32. Substantially in all operating positions, over most of the length of the shaft portion 32, the support 43 is located at a distance from the shaft portion 32. At the start of the pump stroke, the shaft portion 32 can be radially inwardly deformed by this distance under compressive loading, but would then be immediately fixed by the support 44. This is in particular achieved in that the shaft portion located within the support or the sliding guide 43 has, in the longitudinal direction, successive portions with a different inside width. Of these, a narrower portion 35, which is shorter than its width, establishes the positionally fixed connection to the elastically compressible insertion pin 26.

The lower end of the sliding guide 43 in the starting position extends into the vicinity of the delivery valve 21 and the vent valve 74 surrounding the latter. It acts on the conical outer circumference 38 under the tension of the restoring spring 53. Thus, the valve body is loaded in the sense of its closing movement and precisely centered. The shaft portion 32 is exposed to a stretching force. The connection of the outer circumference 38 to the pump piston 17 can take place in such a way that the connecting portion between the piston lip or lips and the ram 20 can be slightly radially inwardly deformed by said tension. Thus, with respect to their pressing force on the cylinder path in the starting position, the piston lips are correspondingly relieved, but without removing the tight engagement.

As a result of this, and through the supports 43, 44, it is possible to produce the body 51 or all components located within the casing area from a softer or soft elastic material, without any risk of permanent deformation. To the shaft portion 32 or to the receptacle 35 is connected upwards towards the discharge opening 8 a cross-sectionally reinforced longitudinal portion 75 of the shaft portion 47, whose outside width is the same as that of the shaft portion 32. However, its inside width is smaller than that of the receptacle 35. The inside width defines an associated portion of the outlet channel 19. This longitudinal portion 75 extends in the starting position over roughly half the length between the top of sliding guide 43 and the socket 49. It transitions into a weaker longitudinal portion, whose outside width is reduced and which forms with its upper end the hollow plug 76 for reception in the socket 49. The other, lower end of the ram 20 or the portion 24, namely the associated end of the pump piston 17, forms an end stop for the pump movement and runs onto the stop 57.

Within a chamber jacket 61 and two end walls 62, 63, the restoring spring 53 defines a tightly closed working chamber 60 which, in the starting position, is filled with air under an overpressure and forms a compression chamber. The cap-like end wall 62 forms the valve body 23. The end wall 63 located at the medium intake is approximately planar. The chamber jacket 61 is constructed as a bellows substantially uniform over its length. Its alternately oppositely frustum-shaped-connected longitudinal portions can be moved against one another approximately up to the complete engagement of their inner and outer faces. One of these longitudinal portions is connected in one piece to the end of the cap jacket of the end wall 62. The other longitudinal portion is correspondingly connected to an approximately cylindrical jacket edge of the end wall 63.

Figure 3:
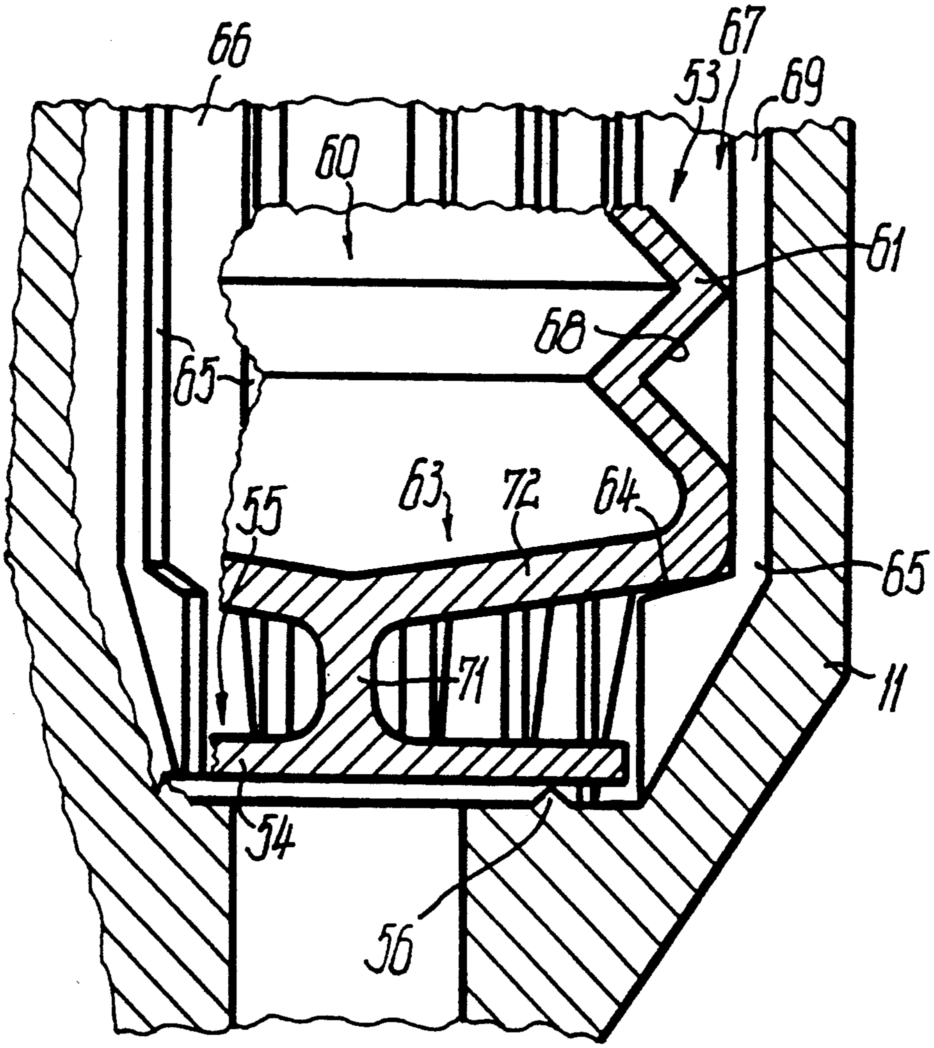

The upper end of the spring 53 at the operating ram 20 is fixed via the insertion pin 26, or during the return stroke also via the valve seat 41, relative to the unit 4. Referring to FIG. 3, the other, lower end is supported by the outer circumference of the outside of the end wall 63 on the shoulder faces 64, which project from the inside of the casing 11 in a ring around the axis 10. They are appropriately formed by projecting end portions of longitudinal ribs 65 on the jacket of the casing 11 and guide or center the chamber jacket 61 on its outer circumference. Each shoulder face 64 extends only over the radial extension between the narrowest inner diameter and the widest outer diameter of the chamber jacket 61. Thus, there is a central area of the end wall 63 free in unsupported manner with a much larger radial extension.

The working chamber 60 and its chamber jacket 61, in the starting position, and located with most of their longitudinal extension within a casing area 66, which is constricted compared with the pump chamber 18. The area is connected to the stop 57 and extends substantially up to the valve 55 and is provided over its length with the longitudinal ribs 65. The remaining part of this length is located within the pump chamber 18 or the hollow pump piston 17. The pump piston 17 inner circumference in the pump stroke end position forms an extension of the inner circumference of the casing area 66. Thus, the spring 53 represents a hollow filling body tightly closed with respect to said areas within its outer boundaries. The filling body 53 defines, with the casing 11, the casing area 66 substantially over its entire length on a jacket-like gap 67, which is located between the outer circumference of the chamber jacket 61 and the inner circumference of the jacket of the casing 11.

A corresponding, but slightly wider, gap is also formed in the pump chamber 18 and in the pump piston 17. As a result of the profiling of the chamber jacket 61, the latter forms on the outer circumference a plurality of circular, axially adjacent depressions 68, whose bottom is bounded in axial section by two flanks at an angle to one another. In cross-section, the bottom is radially outwardly widened or widened to the longitudinal channels 69 defined between the longitudinal ribs 65. They remain free for flow during all operating states of the filling body 53. If the spring 53 is compressed during the pump stroke, then the depressions 68 are constricted. The medium located therein is displaced through the gaps in the longitudinal channels 69 towards the valve 21, so that the casing area 66 can almost be completely emptied during the pump stroke.

The working chamber 60 or filling body 70 or the entire associated subassembly 52 is appropriately made from a material, which is resiliently elastic with respect to bending, expansion and compression. The subassembly 51 can also be made from a similar or an identically elastic material. Therefore, both engaging valve faces or valve bodies of the valve 21 are made from a material which is elastically deformable under the operationally caused forces. Even if the valve body 23 and, by engaging on the valve seat 42, the valve body 22, together with the adjacent shaft portion formed by the valve spring 32 and the jacket of the pump piston 17, including the circumferential surface 38, can be displaced under a radially outwardly directed tension, namely by the air filling of the working chamber 60, during the fitting of the discharge apparatus 1 or during the connection to the subassembly 51. As a result of the tension, the seal between these areas or surfaces and the associated mating surfaces of the body 2 is significantly increased and installation is facilitated.

The other, lower end of the restoring spring 53 is constructed in one piece with the dish-shaped valve body 54, which is connected by means of a shaft 71 to the associated end wall of the hollow body, is spaced from said end wall and at least under the compressive loads which occur is dimensionally stable, instead of being self-resistent. As a result, the restoring spring 53 simultaneously forms a valve spring constructed in one piece with the valve body 54. The valve body 54 performs an axial opening movement against the same. It is raised axially from the valve seat 56 in the case of a corresponding pressure difference. Thus, the medium can pass from the riser 13 around the valve body 54 into the other casing area 66 and fill the area 66 defined between the outer circumference of the restoring spring 53 and the jacket of the casing 11 without penetrating the interior of the outer circumference of the spring 53. Through the choice of the gas or air pressure in the cavity of the restoring spring 53, its spring characteristic can be precisely adjusted.

The planar, disk-shaped valve body 54 is not loaded by the same restoring spring 53 for the unit 4 substantially defined by the foldable chamber jacket 61, but instead by a separate disk or plate-like valve spring 72. The latter is substantially only formed by the end wall 63 and is therefore in one piece with the restoring spring 53. In the starting position, the valve spring 72 is flat frustum-shaped and curved outwards towards the center, where at its top, it passes into the central shaft 71. The valve spring 72 and the valve body 54 project far past its outer circumference. Consequeltly, against its axial tension and against the gas pressure in the working chamber 60, the valve spring can be pressed inwards, while carrying with it the valve body 54 with respect to the shoulder faces 64. It rolls on the shoulder faces 64 and the valve body 54 lifts with its planar valve closing face from the valve seat 56.

To this extent the opening force of the valve 55 can be adjusted with the gas pressure in the working chamber 60. The valve seat 56 is appropriately formed by a relatively sharp edge face which, in cross-section, is bounded by two flanks roughly at right angles to one another and is annular, surrounding in radial spaced manner an inlet channel from the riser 13. The latter is formed by the end of the inner circumference of the riser 13. As a result of the described construction, the valve body 54 is also made from the elastic material. The valve seat 56 is made from a much harder material. The inner longitudinal edges of the projections for the shoulder faces 64 simultaneously form longitudinal guides for the outer circumference of the valve body 54. Thus, the latter, substantially without any tilting movements parallel to the axis 10 can be raised from the valve seat 56 and therefore uniformly over its entire circumference.

The riser 13 is connected to the portion associated with the casing area 66 by means of a casing portion, which is frustum-shaped and has the said projections on the inside. Over its entire length necessary for discharge operation or to the bottom of the storage container, the tube is constructed in one piece with the casing.

The connecting piece 7 can be closed by a fitted, one-piece protective cap 73, which approximately extends up to the operating pressure surface of the handle 6 and is somewhat narrower that the latter.

Each of the mentioned configurations, parts, units or spaces respective functions can be provided in only a single occurance or in a plurality of two or more, for example, to provide successive and/or simultaneous multiple media discharge from multiple separate fluid or pressure sources through a single and/or a plurality of discharge openings 8.

We claim:

1. A dispenser for discharging media, the dispenser comprising:
   - a basic dispenser body (2) having a discharge and operating head (5), said discharge and operating head having an outlet channel (19) and a medium outlet (8);
   - a plunger (20) to be moved relative to said basic dispenser body (2) for discharge operation;
   - wherein the outlet channel (19) provides medium guide faces for operationally receiving and guiding the media to the medium outlet (8), said medium guide faces defining medium spaces for receiving the medium; and
   - wherein the plunger (20) is moveable in a control motion, said plunger (20) having a shaft section (32), said shaft section (32) being elastically deformable during a portion of said control motion of said plunger (20),
   - wherein said shaft section (32) provides first guide face means (33) on an outer circumference of said shaft section (32) and wherein second guide face means (43) are provided for cooperation with said first guide face means (33) for preventing deformation of said shaft section (32) under operational stresses occurring during said control motion, said shaft section (32) being allowed to be deformed in a direction transverse to said guide face means (33, 43) when said shaft section (32) is freed from said first guide face means (43) during said control motion.

2. The dispenser according to claim 1, wherein dispenser portions (5, 17) are provided, at least one of said dispenser portions (5, 17) having a cross-sectional width extension bigger than a corresponding width extension of said shaft section (32), said shaft section (32) being located axially between said dispenser portions (5, 17).

3. The dispenser according to claim 1, wherein said shaft section (32) has a cross-sectional overall width extension and has a guide section guided over an overall length extension in a passage opening having a guide length extension, said overall length extension being substantially twice as big as said width extension, said passage opening having substantially constant cross-sections over said guide length extension.

4. The dispenser according to claim 1, wherein said shaft section (32) has hollow sections provided in the vicinity of said guide face means (43), said hollow sections of said shaft section (32) having a plurality of internal cross sections of different widths, said hollow sections being located in the vicinity of said guide face means (43), and wherein said plunger (20) extends out of said basic dispenser body (2).

5. The dispenser according to claim 1, further comprising a functional member defined by at least one of:

a nozzle core (48) of a medium outlet nozzle; and a plurality of profilings (59) on an end face of a whirling device;

said shaft section (32) being constructed in one part with said functional member.

6. The dispenser according to claim 1, wherein said shaft section (32) is operationally deformable by an axial shortening deformation.

7. The dispenser according to claim 1, wherein said at least one shaft section (32) at least partly forms a spring.

8. The dispenser according to claim 1, wherein a casing cover (12) is provided, said casing cover at least partially enclosing said first guide face means (43), said shaft section (32) being guided by said first guide face means (43).

9. The dispenser according to claim 1, wherein a valve (21, 74) is provided; in an initial position, said shaft section (32) being positively centered by said basic body (2) directly adjacent to said valve (21, 74), said basic body (2) providing a casing and said first guide face means (43).

10. The dispenser according to claim 1, wherein said shaft section (32) has a spring portion with an overall length extension and wherein said first guide means (33) includes a guide passage engaging said spring portion (32) providing said outer circumference (33) of said shaft section (32), said guide passage providing support for said outer circumference (33) over substantially said overall length extension during stresses of said deformation.

11. The dispenser according to claim 1, wherein said plunger (20) has ends, a maximum cross sectional width extension, and an outer circumference on length sections spaced from at least one of said ends, said plunger (20) being made from resiliently deformable material, one of said length sections of said plunger (20) being located substantially contact-free with respect to said outer circumference over a length extension corresponding to more than half an overall length extension of said plunger (20).

12. The dispenser according to claim 11, wherein said plunger (20) has a longitudinally extending section (47) having a wall that varies in thickness along the section (47), said longitudinally extending section (47) being substantially resistant to deformation, and said longitudinally extending section (47) having a portion of increased wall thickness that extends over no more than half of said contact-free portion of the plunger 20

13. The dispenser according to claim 1, wherein a valve (21, 74) is provided, said valve (21, 74) having a first valve body (22, 38) and a second valve body (23), at least one of said first valve body and second valve body (22, 38) being an annular valve body, said first and second valve body being located in a mutually enveloping arrangement.

14. The dispenser according to claim 13, wherein said second valve body is annular.

15. The dispenser according to claim 13, wherein said second valve body provides an innermost valve body (23, 38), said innermost valve body (23, 38) being cross-sectionally annular and said innermost valve body being operationally resiliently deformable.

16. The dispenser according to claim 1, wherein a valve (21) is provided, said valve (21) having reciprocally displaceable valve bodies (22, 23) defining a valve seat (41), both of said valve bodies (22, 23) being made a material having an operational resiliency for at least one of the resilient control motions including:

a bending motion;

an expansion motion; and a compression motion.

17. The dispenser according to claim 13, wherein said first valve body is made in one part, and said second valve body (22, 23) provides cooperating valve closing faces (42, 41).

18. The dispenser according to claim 1, wherein said shaft section (32) provides a spring, said spring having first and second surfaces (33, 35), in operation said spring deflecting from an initial position transverse to said first and second surfaces (33, 35), said first surface (33) defining a leading surface and said second surface (35) defining a trailing surface of said spring (32), said trailing surface (35) being substantially free of support in said initial position of said spring.

19. The dispenser according to claim 18, wherein said trailing surface is provided by an inner circumference opposed by a support (44), said support (44) being spaced from said inner circumference by a gap in said initial position.

20. The dispenser according to claim 1, wherein at least one mandrel (26) of a resiliently compressible material is provided, said mandrel (26) engaging in said shaft section (32).

21. The dispenser according to claim 20, wherein at least one of said mandrel (26) provides at least one of configurations defined by:

an internal support (44) of at least one of said at least one shaft section; and a partial boundary of said medium guide face.

22. The dispenser according to claim 20, wherein at least one operationally functional member is provided for constituting at least one of elements defined by:

at least one valve body (23, 54);

a restoring spring (53);

a valve spring (30);

a volume-variable drive chamber (60);

a volume-variable filling body (70);

and a bellows;

at least one of said elements being made in one part with at least one of said at least one mandrel (26).

23. The dispenser according to claim 1, wherein a thrust piston pump (3) having at pump chamber (18) and an actuating shaft (20) is provided, said plunger providing said actuating shaft of said thrust piston pump, said plunger (20) having a plunger end remote from said pump chamber (18), said plunger end bearing an actuating head (5) for manual discharge actuation.

24. The dispenser according to claim 23, wherein said thrust piston pump (3) has at least one member defined by:

an outlet socket (49) having said medium outlet (8);

an actuating handle (6);

a cap (9) of said actuating head (5);

a pump cover (12); and a pump casing (11).

25. The dispenser according to claim 13, wherein said first valve body is made in one part, said first and and second valve bodies (22, 23) providing cooperating valve closing faces (42, 41).

* * * * *

UNITED STATES PATENT AND TRADEMARK OFFICE

CERTIFICATE OF CORRECTION

PATENT NO. : 5,316,198

DATED : May 31, 1994

INVENTOR(S) : Fuchs et al.

It is certified that error appears in the above-identified patent and that said Letters Patent is hereby corrected as shown below:

| | |
|---|---|
| Col. 9, line 45 | "self-resistent" should be --self-resilient--. |
| Col. 10, line 1 | "Consequeltly" should be --Consequently--. |
| Col. 10, line 35 | "that" should be --than--. |
| Col. 10, line 38 | "occurance" should be --occurrence--. |
| Col. 11, line 24 | "cross section" should be --crosssection--. |
| Col. 11, line 62 | "cross section" should be --crosssection--. |
| Col. 12, line 29 | "made a" should be --made of a--. |
| Col. 14, line 10 | Remove one "and". |

Signed and Sealed this

Thirteenth Day of December, 1994

*Attest:*

Bruce Lehman

BRUCE LEHMAN

*Attesting Officer*

*Commissioner of Patents and Trademarks*

UNITED STATES PATENT AND TRADEMARK OFFICE

CERTIFICATE OF CORRECTION

PATENT NO. : 5,316,198

DATED : May 31, 1994

INVENTOR(S) : Fuchs, et al.

It is certified that error appears in the above-indentified patent and that said Letters Patent is hereby corrected as shown below:

Col. 11, line 24 "crosssection" should be --cross sections--.

Col. 11, line 62 "crosssection" should be --cross-sectional--.

Signed and Sealed this

Twentieth Day of February, 1996

Attest:

Bruce Lehman

BRUCE LEHMAN

*Attesting Officer*

*Commissioner of Patents and Trademarks*